United States Patent [19]

Fennel, Jr. et al.

[11] 4,322,845

[45] Mar. 30, 1982

[54] DEMAND ASSIGNMENT TECHNIQUE FOR TDMA SATELLITE COMMUNICATION NETWORK

[75] Inventors: John W. Fennel, Jr., Olney; Jan G. Oblonsky, Brookeville, both of Md.

[73] Assignee: IBM Corporation, Armonk, N.Y.

[21] Appl. No.: 79,928

[22] Filed: Sep. 28, 1979

[51] Int. Cl.³ .......................... H04J 3/06; H04J 3/16
[52] U.S. Cl. .................................... 370/104; 370/95
[58] Field of Search .................... 370/104, 95; 375/3; 455/12

[56] References Cited

U.S. PATENT DOCUMENTS

| | | | |
|---|---|---|---|
| Re. 28,577 | 10/1975 | Schmidt | 370/104 |
| 3,649,764 | 3/1972 | Maillet | 370/104 |
| 3,816,666 | 6/1974 | Tomozawa et al. | 370/104 |
| 4,204,093 | 5/1980 | Yeh | 370/104 |

*Primary Examiner*—Douglas W. Olms
*Attorney, Agent, or Firm*—John E. Hoel

[57] ABSTRACT

In a time division multiple access satellite communication system, a reference station which allocates channel capacity also regulates demand by the ground stations for that capacity. The regulation is accomplished by means in the reference station for transmitting limiting, blocking and revocation messages to the ground stations and means in the ground stations responsive to these messages to regulate the processing of input service requests. The limiting messages notify the ground stations to limit their channel usage to the channels required in the last demand message transmitted but not to exceed their last channel assignment. The blocking messages instruct the ground stations to unconditionally block any new requests for service on their input ports, rather than counting such calls as increments of demand, and thereby effectively reduce the aggregate demand in the system. When the reference station observes that a sufficient decrease in channel requirements occurs, resulting in an increasing spare capacity, it revokes the previously communicated blocking messages by a revocation message.

8 Claims, 15 Drawing Figures

DEMAND ASSIGNMENT MECHANISM AT SUBSIDIARY STATION

VOICE ACTIVITY PROBABILITY
CALCULATOR AT SUBSIDIARY STATION

FIG. 5  DEMAND ASSIGNMENT MECHANISM AT SUBSIDIARY STATION

FIG. 7 DEMAND ASSIGNMENT MECHANISM AT REFERENCE STATION

FIG. 8

FIG. 9  MECHANISM TO CALCULATE CAPACITY REQUIREMENTS AT THE SUBSIDIARY STATION

FIG. 10
VOICE CALL LIMITING MECHANISM AT THE SUBSIDIARY STATION

NETWORK CHANNEL DISTRIBUTION OPERATION

FIG. 15
SUBSIDIARY STATION OPERATION

DEMAND ASSIGNMENT TECHNIQUE FOR TDMA SATELLITE COMMUNICATION NETWORK

FIELD OF THE INVENTION

The invention disclosed broadly relates to satellite communications and more particularly relates to an improved demand assignment technique for a satellite communications network.

BACKGROUND OF THE INVENTION

Conventional time domain multiple access (TDMA) satellite communication networks employ multiple radio stations which communicate through an earth satellite repeater by transmitting time-synchronized bursts of radio energy relative to the repeater and which receive a time multiplex composite of bursts containing corresponding modulated information from the repeater. In TDMA operations, multiple ground stations associated with radio signaling nodes transmit bursts of time concentrated information signals on a shared carrier frequency spectrum and receive the same information signals after repetition by the satellite repeater on a shifted carrier frequency spectrum. Each ground station is assigned a particular time slot in a continuum of recurrent frames for transmission of its bursts and for the reception of its own bursts and the bursts of other stations. The bursts interleave at the satellite in close time formation without overlapping.

In prior art demand assignment operation, the length of the assigned slots may be varied in accordance with the relative distribution of demand at the various ground station signaling nodes. Prior art demand assignment techniques have been found to require excessive amounts of time to carry out the transition from a first set of channel assignments to a second set of channel assignments. The additional time required for prior art demand assignment techniques to carry out a shift in channel assignments imposes a higher probability that new calls may be blocked during the reassignment period.

OBJECTS OF THE INVENTION

It is therefore an object of the invention to increase the efficiency with which changes in channel assignments can be made in a TDMA satellite communication network.

It is another object of the invention to minimize the probability of blockage for new calls in a TDMA satellite communication network.

It is a further object of the invention to improve the transition time in the demand assignment operation of a TDMA satellite communication network.

SUMMARY OF THE INVENTION

These and other objects, features, and advantages of the invention are accomplished by the improved demand assignment technique disclosed herein. In a time division multiple access satellite communication system, a reference station which allocates channel capacity also regulates demand by the ground stations for that capacity. The regulation is accomplished by means in the reference station for transmitting limiting, blocking and revocation messages to the ground stations and means in the ground stations responsive to these messages to regulate the processing of input service requests. The limiting messages notify the ground stations to limit their channel usage to the channels required in the last demand message transmitted but not to exceed their last channel assignment. The blocking messages instruct the ground stations to unconditionally block any new requests for service on their input ports, rather than counting such calls as increments of demand, and thereby effectively reduce the aggregate demand in the system. When the reference station observes that a sufficient decrease in channel requirements, resulting in an increasing spare capacity occurs, it revokes the previously communicated blocking messages by a revocation message. The resultant improved demand assignment technique provides a more efficient means for reassigning communication channels in a TDMA network and minimizes the probability of blockage for new calls during the reassignment period.

DESCRIPTION OF THE FIGURES

These and other objects, features, and advantages of the invention can be more fully appreciated with reference to the accompanying figures.

DISCUSSION OF THE PREFERRED EMBODIMENT

Figure 1:
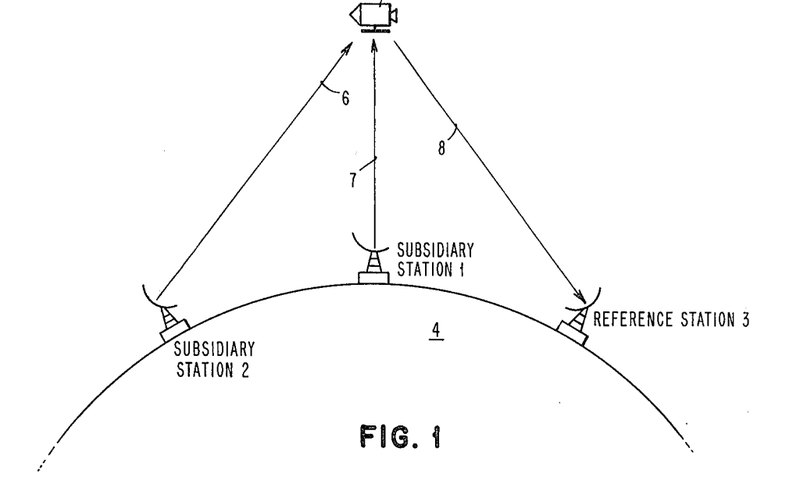
FIG. 1 is a schematic representation of the relative position of the reference station, subsidiary stations, and satellite relative to the earth's surface for the first stage of the demand assignment operation when the subsidiary stations send their demands to the reference station.
Figure 3:
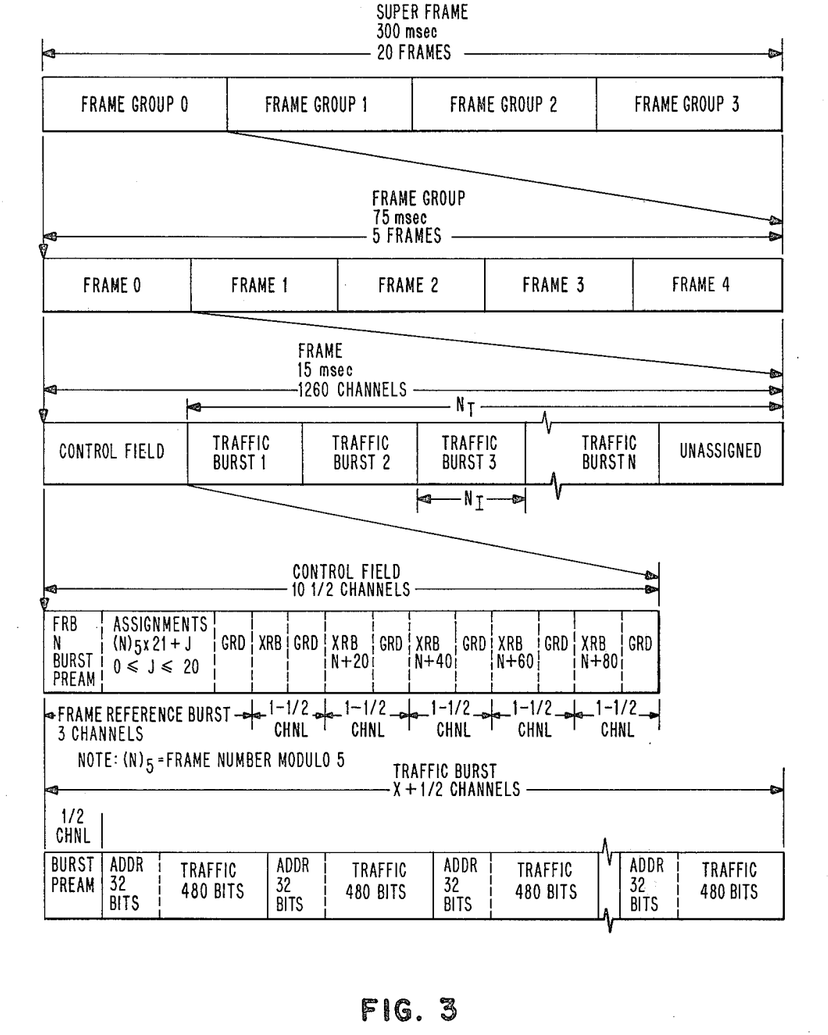
FIG. 3 illustrates the super frame format for the TDMA network.

Time Division Multiple Access (TDMA) is the sharing of the full band width of the satellite transponder on a time divided basis, by two or more earth stations. FIG. 1 illustrates the relative positions of the subsidiary earth stations 1 and 2 and the reference station 3 on the surface of the earth 4 with respect to the synchronous satellite 5 orbiting at approximately 22,500 miles above the surface of the earth 4. Each earth station includes connections to incoming digital lines and voice lines 5 originating from terrestrial sources. These input lines are respectively connected to digital data ports and voice ports on a Satellite Communications Controller (SCC). The SCC is a computer controlled satellite communications switching system which employs digital 10 transmission techniques in a time division multiple access format. This format, shown in FIG. 3, is output to a burst modem. On a real time basis, the burst modem encodes the base band signals received from the satellite communications controller and interfaces with radio 15 frequency equipment at an intermediate frequency. During reception, the burst modem decodes the signals received from the RF equipment and interfaces with the SCC at a base band frequency. The burst modem is gated on and off during transmission by the SCC. The 20 burst modem has a low duty cycle with the on period burst being interleaved with that of the other other earth stations on a time sharing basis with the same carrier frequency, consistent with the TDMA mode of operation. 25

As is shown in the format of FIG. 3, time at the satellite is divided into fifteen millisecond units called frames. Each earth station in a transponder is assigned, by the reference station 3, a portion of the frame in which to transmit its traffic burst. Each traffic burst is 30 received by all earth stations in the transponder. The amount of time assigned for each earth station's traffic burst may be different for each earth station and also may vary over time. The length of time assigned to each earth station is determined by the demand assignment 35 mechanism disclosed herein. This mechanism considers the traffic requirements of each earth station and of the total network to determine the amount of time each earth station will be assigned in a frame.

As is shown in FIG. 3, a frame consists of a fixed time 40 period allocated for transmission of network control and synchronization information and for transmission of traffic, from the active earth stations in the network to one or more other other stations in the network. The fifteen millisecond frame is divided into two segments, 45 the control and the traffic fields. Bursts of information from each of the ground stations are transmitted on a time division multiple access basis in each frame. Each burst contains units of information called channels which consist of 512 binary bits each. 50

The first part of the frame is the control field. The control field is 10.5 channels in length. The frame control field consists of the Frame Reference Burst (FRB) and five Transmit Reference Bursts (XRB). The FRB is a 2.5 channel burst plus one-half channel of guard time, 55 transmitted once each frame by the reference station. It contains assignment information for twenty-one earth stations and marks the beginning of each frame. The FRB is used by the SCC at each ground station to maintain frame synchronization. 60

The transmit reference burst is a one channel burst plus a one-half channel of guard time transmitted by each ground station once every twenty frames, called a super frame, as shown in FIG. 3. Each ground station is assigned a fixed position in one of the frame control 65 fields into which it bursts its transmit reference burst. Each SCC at each ground station uses its transmit reference burst to maintain transmit clock synchronization.

Each SCC also uses its transmit reference burst to transmit demand requests for transponder capacity, to the reference station.

FIG. 1 illustrates the direction of information flow for the transmission of a demand for channel capacity 6 from the ground station 2 and a demand for channel capacity 7 from the ground station 1 via the satellite 5 where these demands are combined in a TDMA format 8 and transmitted to the reference station 3.

Figure 2:
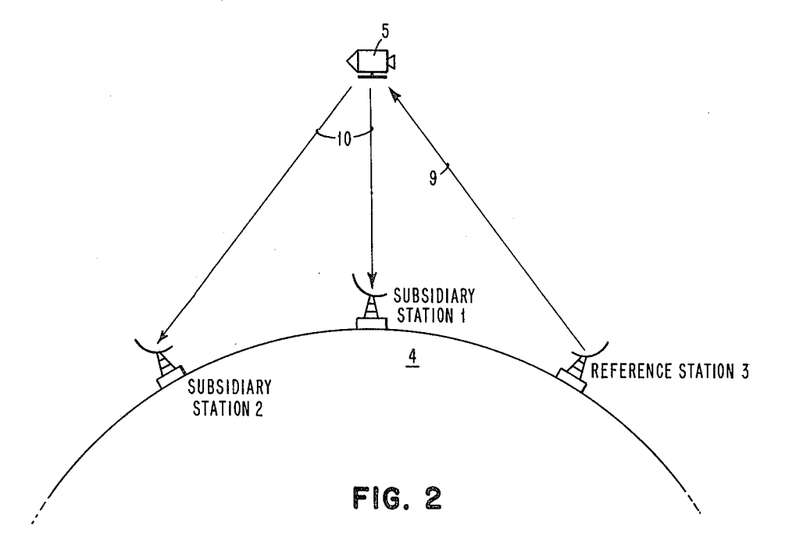
FIG. 2 is a second schematic diagram of the earth stations, shown in FIG. 1, when the reference station sends the channel assignments to the subsidiary stations.

FIG. 2 illustrates the response by the reference station 3 transmitting the channel assignments 9 via the satellite 5 which places the assignments in a TDMA format 10 which is transmitted to the subsidiary stations 1 and 2.

With reference to the format of FIG. 3, the remainder of the frame after the control field is the traffic segment. The traffic segment consists of a single traffic burst from each subsidiary station active in the transponder. The length of the traffic burst is variable. Its length and position are assigned in the frame reference burst by the reference station. The traffic bursts are used by the subsidiary stations to transmit traffic and signaling information. During initial transmit acquisition, the transmit reference signal is sent in the traffic field to determine the range. That part of the traffic field which remains after all of the subsidiary stations have burst is called the unassigned field.

A frame group consists of five frames and has a period of 75 milliseconds. A frame group is the timing basis for the transmission of the burst assignments to all subsidiary stations in the transponder. The frame group contains five frame reference bursts which contain 105 burst assignments. The frame group also contains slots for twenty-five transmit reference bursts from the respective twenty-five subsidiary stations to the reference station.

As is shown in FIG. 3, a super frame consists of four frame groups and a has a period of 300 milliseconds. The super frame is used as the timing basis for the transmit reference bursts and for changes in the traffic burst assignments. Each earth station transmits its transmit reference bursts once every super frame. The reference station transmits a complete set of assignments which is repeated four times in a super frame. New assignments become effective on a super frame boundary, two super frames after the transmission thereof.

Figure 5:
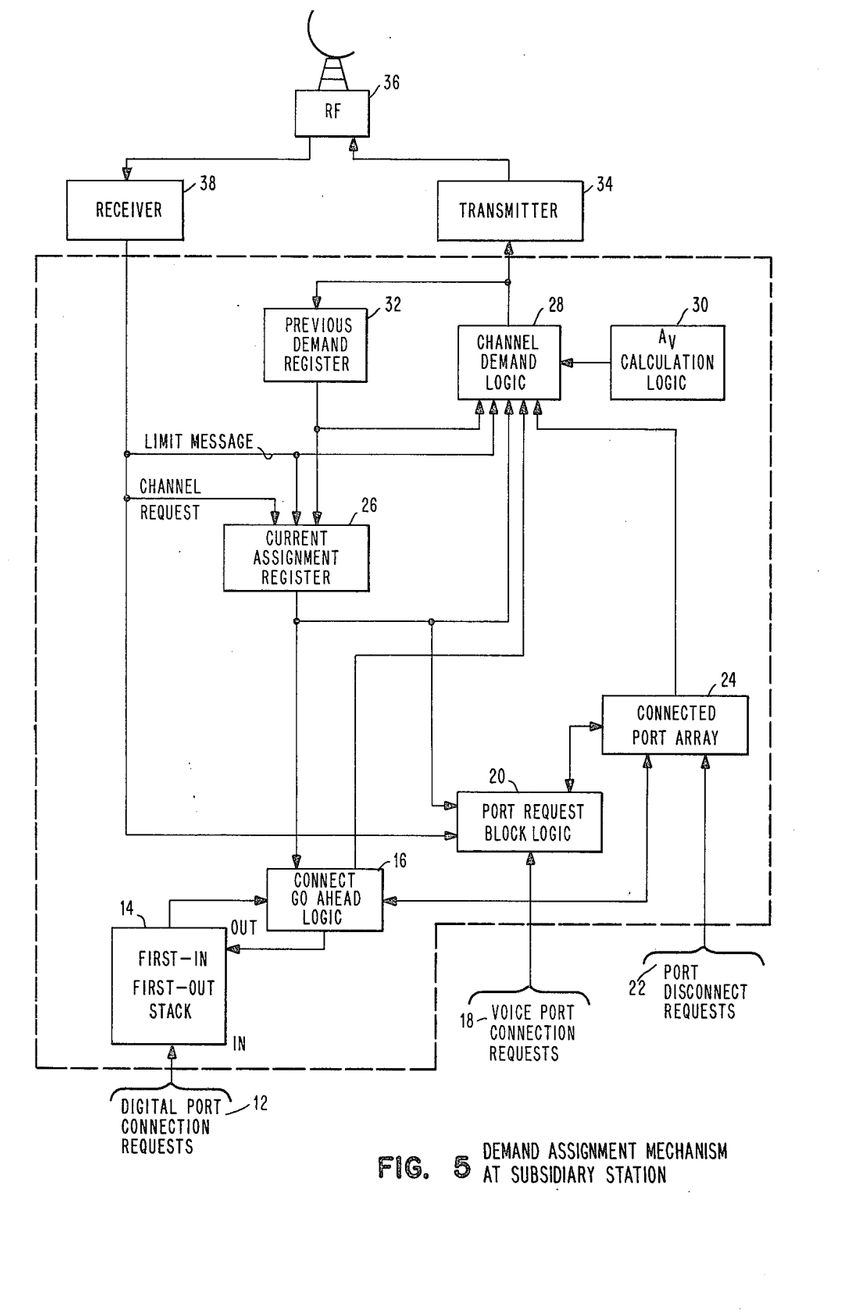
FIG. 5 is a functional block diagram of the demand assignment mechanism for a subsidiary station.

As described above, FIG. 1 shows the TDMA satellite communication system, including a satellite transponder 5, a reference station 3, and a plurality of ground stations 1 and 2. FIG. 5 shows that each ground station 1 and 2 has input ports 12 and 18 for connecting asynchronous surface requests for voice transmission 18 or data transmission 12 from a terrestrial network to a satellite transponder 5. The TDMA format shown in FIG. 3 provides the context wherein the reference station assigns a subplurality of channels $N_J$ from a plurality $N_T$ of time division channels to each ground station 1 and 2 based upon the demand made by each of the respective ground stations 1 and 2 for channel capacity.

FIG. 5 shows the demand assignment mechanism for a local ground station 1 and 2. Digital port connection requests 12 are input to a first-in-first-out (FIFO) stack 14, having input and output connections to a connect go-ahead logic block 16. The output of logic block 16 is connected to the channel demand logic 28. Voice port connection requests 18 are input to a port request block logic 20 whose output is gated by a connected port array gate 24 which goes to the channel demand logic 28. Port disconnect requests 22 are also input to the connecting port array gate 24. A channel demand logic 28 calculates channel demands based upon port requests.

FIG. 5 also shows a transmitter block 34 which can be, for example, a burst modem as was previously described. The output of the transmitter block 34 is connected to the RF terminal 36 which transmits channel demands calculated by the channel demand logic 28 to the satellite transponder 5.

Figure 7:
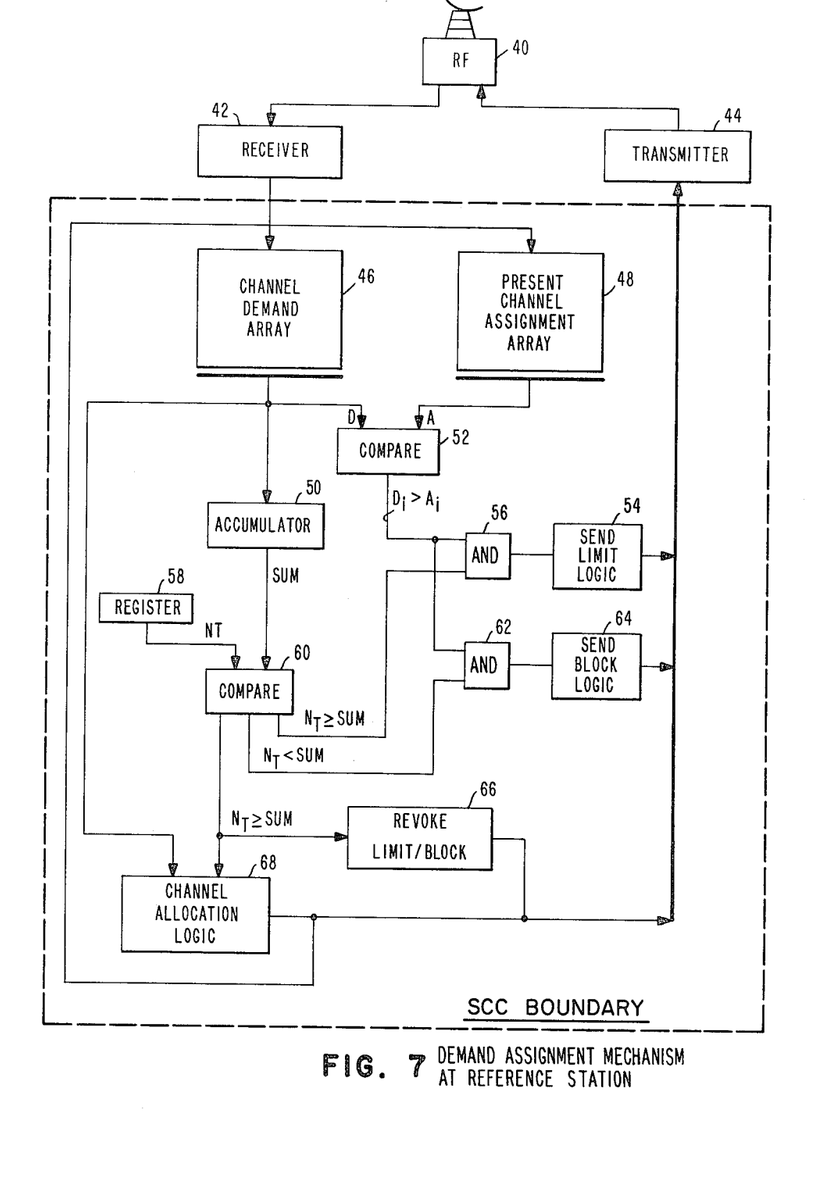
FIG. 7 is a functional block diagram of the demand assignment mechanism for the reference station.

FIG. 7 shows the demand assignment mechanism in the reference SCC ground station 3. The channel demands from the demand assignment mechanism at the local SCC 1, shown in FIG. 5, which were transponded through the satellite 5, are received by the RF terminal 40 of the reference SCC 3, as shown in FIG. 7. Channel demands are passed through the receiver block 42 in FIG. 7, from all of the local SCC stations 1 and 2. The channel demand array 46 connected to the output of the receiver 42 stores all of the new demands for channel capacity by all of the stations 1 and 2 in the network. The present channel assignment array 48 stores the existing channel assignments for all of the local stations in the network. In this existing channel assignment the total network capacity is distributed among the participating stations in proportion to their past demands. As long as the total network demand is less than the total network capacity, each station has more channels assigned than what was its past demand. Therefore small fluctuations in traffic may be accommodated by stations immediately without waiting for new channel assignment. The comparator 52 compares the new channel demand from each ground station with its corresponding existing channel assignment. If the new channel demand for a particular ground station is greater than the existing assigned channel capacity, an output signal is supplied from the comparator 52 to the AND gate 56 which initiates the sending of a limit command by the limit logic 54. In this case, the limit command is sent by means of the transmitter 44 and RF terminal 40 through the satellite transponder 5 to all of the local ground stations 1 and 2. The limit command instructs all of the local SCCs 1 and 2 to limit their channel usage to the channels required in the last demand message transmitted plus one channel but not to exceed their last channel assignment. Within this limit, voice and data calls may be connected. When the next set of channel requirements are received by the reference 3 from the local stations 1 and 2, reference 3 knows it represents the maximum usage. At this point new channel assignment is established. The limit message is sent only if the total network capacity $N_T$ is greater than the sum of the new demands for channel capacity. This is determined by the accumulator 50 which maintains a running accumulation of the sum of the new channel demands. This is compared in the comparator 60 with the value of $N_T$ stored in the register 58. If $N_T$ is greater than the sum of the new channel demands, an output is sent to the AND gate 56 thereby enabling the signal from the comparator 52 to reach the send limit logic 54.

FIG. 5 shows the receiver block 38 in a local station 1 or 2, connected to the RF terminal 36 which receives the limit command transponded by the satellite transponder 5 from the reference station 3. The channel demand logic 28 connected to the receiver 38 determines the current assignment from the current assignment register 26 and, in conjunction with the port request block logic 20, blocks new voice port connection requests 18 in a quantity greater than the quantity in the last demand message transmitted plus one channel. Within this limit, voice and data calls may be connected. When the next set of channel requirements are compiled by the channel demand logic 28 and sent by means of the transmitter 34 to the reference station 3, the reference station will know that it represents the maximum present usage.

In FIG. 7, the demand assignment mechanism in the reference station 3 includes the channel allocation logic 68 which is connected to the new channel demand array 46. The channel allocation logic 68 allocates new channels for each of the ground stations 1 and 2 equal to the corresponding channel demand plus a portion of the excess channels ($N_T$ minus the sum of the channel demands), in proportion to the relative demand of the respective ground station with respect to the total channel demand for the entire network. The new channel allocations are output from the channel allocation logic 68 through the transmitter 44 and RF terminal 40 to the local ground stations 1 and 2 via the satellite transponder 5.

When the comparator 60 determines that the sum of all the new channel demands for the network is greater in quantity than the total network channel capacity, an enabling signal is sent to the AND gate 62 which, when combined with a request from any local station for additional channel capacity, will initiate the sending of a block message from the send block logic 64. The block message is issued from the logic 64 through the transmitter 44 and the RF terminal 40 to all of the local stations 1 and 2 via the satellite transponder 5. The block message instructs all network stations 1 and 2 to reject incoming voice calls. Incoming digital calls are queued by the FIFO stack 14 at each local SCC 1 and 2. In this manner, as existing voice and digital calls terminate, capacity becomes available.

In FIG. 5, the blocking message is received over the RF terminal 36 and through the receiver 38 where it is directed to the port request block logic 20. Logic 20, in conjunction with the connected port array logic 24, blocks all new voice port connection requests and queues all new digital calls from the digital port connection 12, in the FIFO stack 14. During the period when the block command is in operation at each local SCC 1 and 2, the channel demand logic 28 periodically issues new channel demands via the transmitter 34 to the reference station 3. As existing voice and digital calls terminate, capacity becomes available.

In FIG. 7, the demand assignment mechanism at the reference SCC 3 has the accumulator 50 continually summing the new channel demands from the local SCCs 1 and 2. The channel allocation logic 68 will allocate new channels $N_I$ for those local stations 1 and 2 in need of additional channel capacity, when the sum of all new channel demands from the local stations is less than the total network channel capacity $N_T$ minus the number of new channels demanded $N_I$. The reference station 3 transmits the new channel allocations over the transmitter 44 and the RF terminal 40 through the satellite transponder 5 to the local stations 1 and 2.

In addition, a special revocation message may be sent from the reference station to the local stations to affirmatively revoke the effect of the blocking message.

Figure 6:
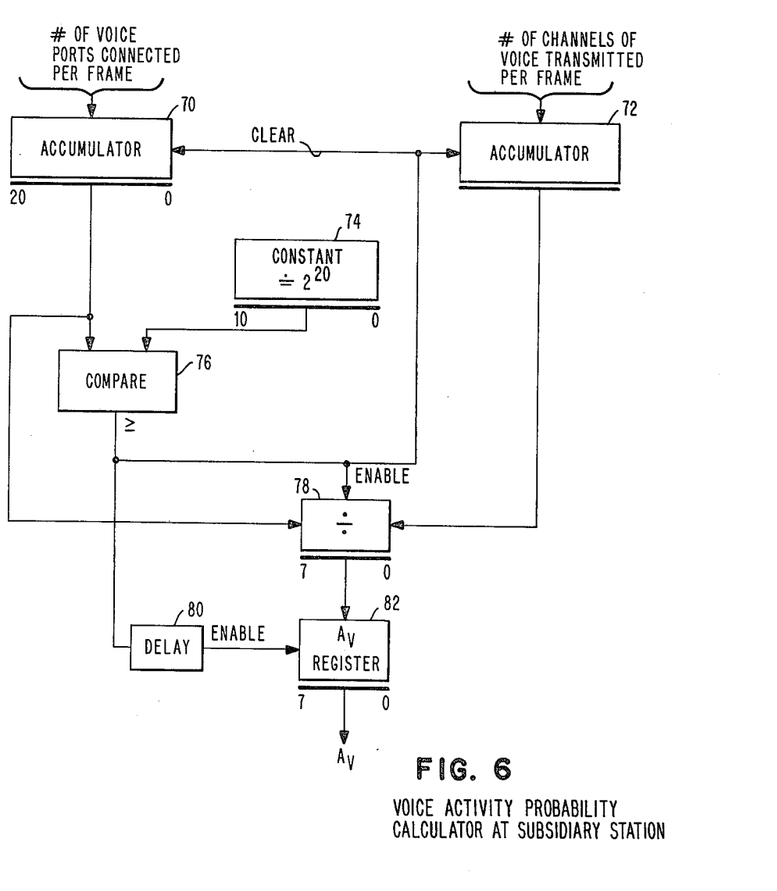
FIG. 6 is a logic block diagram of the mechanism for calculating voice activity probability in the subsidiary ground station.
Figure 9:
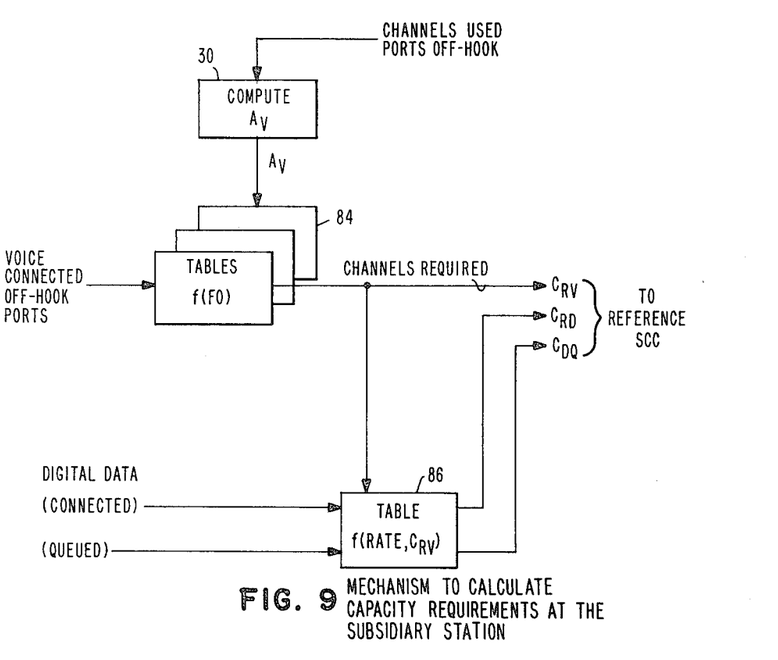
FIG. 9 is a functional block diagram of the mechanism for calculating capacity requirements in the subsidiary station.

FIG. 6 is a more detailed illustration of the logic at the local stations 1 and 2 for calculating the voice activity ratio ($A_V$) which is employed in determining the channel demand for the local station. Periodically, all user SCCs 1 and 2 send to the reference SCC 3 their current channel requirements. FIG. 9 outlines this process. Connected voice off-hooks are the independent variable used in a table look-up schematically shown at 84 in FIG. 9, which yields the number of channels required to support those voice calls. The table lists channels required versus voice off-hooks in a manner similar to the graph shown in FIG. 11. The particular table used is determined by the voice activity ratio ($A_V$) which is computed at the local SCC 1 or 2 by means of the logic 30, shown in FIG. 6.

FIG. 6 shows the accumulator 70 having as an input the number of voice ports connected per frame. The accumulator 72 has as its input, the number of channels of voice transmitted per frame. The comparator 76 compares the sum in the accumulator 70 with a constant stored in the register 74 and if the sum from the accumulator 70 is greater than the constant, the division logic 78 is enabled which divides the sum of the number of blocks of speech generated per frame by the sum of number of speakers connected per frame. The quotient is the magnitude of the voice activity ratio ($A_V$) which is used to select the particular table entry in the table look-up 84, yielding the actual number of channels required. This is the demand quantity sent by the local SCC 1 or 2 to the reference station 3.

OPERATION OF THE INVENTION

Figure 4:
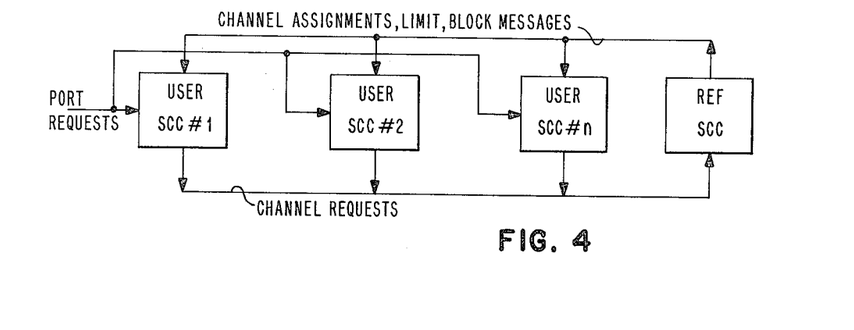
FIG. 4 is a schematic diagram of the information flow for channel requirements and channel assignments.

The function of the system is to properly manage network channel capacity. Channel requirements (demands) are computed by user SCCs in the network and transmitted to the reference SCC via the XRB channels. After computing channel assignments, based on these demands, assignments are made via the FRB channels, as shown in FIG. 4.

The network channel capacity ($N_T$) can be assumed to be a constant number of channels. Generally, the entire capacity of the network is distributed to the user stations. In cases where total network demand exceeds, or nearly exceeds network capacity, use could be made of the transponder channel pool, if authorized. When invoked, a number of channels from the pool are temporarily made available to that network.

Figure 8:
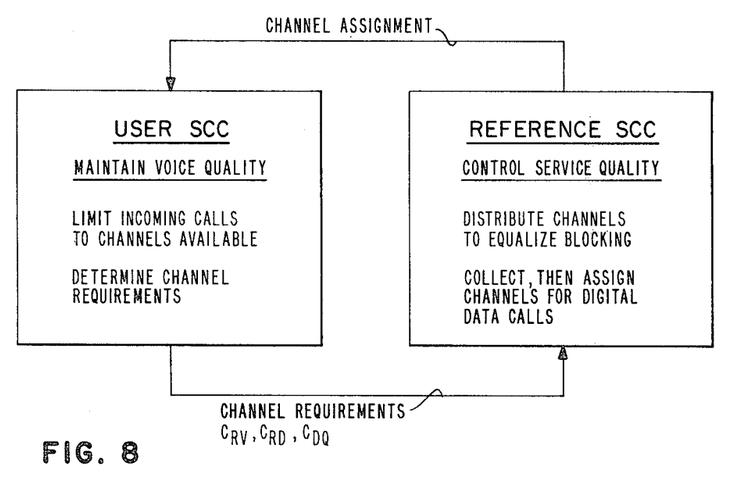
FIG. 8 is a functional block diagram illustrating the operations carried out in the reference station and the subsidiary station.

Maintenance of voice quality, as in FIG. 8, that is, limiting freeze-outs suffered by users of an SCC to a certain level, is done by user SCCs. A user SCC, given a channel assignment, must limit the number of voice calls connected to it so that the freeze-out criterion is not violated. This is done by the channel requirement method. Also, user SCCs compute channel requirements for connected voice ($C_{RV}$), channels required for connected digital calls ($C_{RD}$), and capacity required for oldest queued digital calls ($C_{QD}$).

Control of service quality is by the reference SCC 3. It must distribute channel capacity among the user SCCs 1, 2, and 3 such that the probability of call blocking is constant across the network. This is done by the channel distribution method. The reference SCC 3 has a command which causes all user SCCs in the network to block incoming voice calls. This is used to collect channels for digital data calls, for example.

User Station Channel Requirement Method

Periodically, all user SCCs 1 and 2 send to the reference SCC 3 their current channel requirements. FIG. 9 outlines this process. Connected voice off-hooks key a table look-up 84 which yields channels required to support those voice calls. The table lists channels required versus voice off-hooks. The particular table entry used is determined by the voice activity ratio ($A_V$) computed at that SCC. Finally, the set of tables in the SCC is selected according to the maximum freeze-out level desired at that SCC.

Digital data requirements are figured separately. Channel requirements for connected data ports ($C_{RD}$) are computed whenever voice channel requirements change significantly, or whenever a new digital call is connected or disconnected. Also, before a digital call is connected, a calculation is done to determine if that call can be connected, or if it must be queued at the SCC 1.

The number of channels required to support a set of digital connections is determined as follows. First, the ports are separated into two categories, high speed and low speed. For high speed ports the channel requirement is determined from a table look-up 86 of FIG. 9. The table entry is normally equal to the maximum number of channels that port can send in a frame. It may be possible, in future applications, where data freeze-outs are permissible and port activity factors are known, to assign a lesser number of channels to a port. The table 86 accommodates this possibility.

For low speed ports, the channel requirement is a function of the port speed and the voice channel requirements. For example, if an SCC 1 is using five channels for voice, simulations show that three channels are required to support 10–19.2 k BPS data ports. However, if twenty-five channels are used for voice, only one additional channel is required to support 10–19.2 k BPS data ports.

Figure 10:
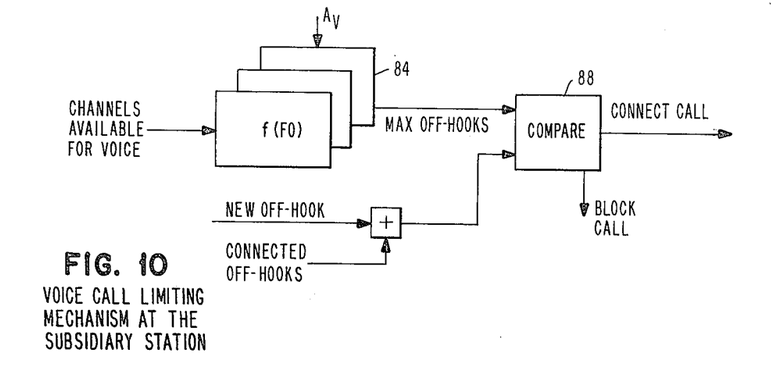
FIG. 10 is a functional block diagram of the voice call limiting mechanism in the subsidiary station.

Voice call limiting, as shown in FIG. 10, insures there is sufficient capacity available for new calls. For a given channel assignment, the maximum number of off-hooks is determined by table 84. If the new off-hook plus the current connected off-hooks would cause the total off-hooks to exceed the maximum, the new call is blocked by 88.

New data calls must also be limited so as to not exceed the available capacity. However, data calls which cannot be connected are queued in 14 of FIG. 5, unless the sum of the connected and queued capacity requests exceeds the maximum SCC limit, in which case the new data call is blocked. The demand message to the reference 3 for data includes the capacity required for the oldest queued data call ($C_{QD}$) plus an indication of the time of arrival of the oldest queued call with respect to when "block" was set for the network. Generally, when channel capacity becomes available, queued data calls at the SCC 1 are connected in FIFO order in 14.

Voice Channel Requirements

Much of the channel capacity in a network will be used for voice traffic. High efficiency of voice operation is essential for good network efficiency. A measure of efficiency for voice operation is the Voice Activity Compression (VAC) advantage obtained using voice compression techniques.

VAC advantage is a strong function of the voice activity probability ($A_V$). Several factors can influence ($A_V$), for example: voice activity threshold, applied talkspurt overhang, line noise, office background noise, type of business, regional speech characteristics, and use of analog modems.

Figure 11:
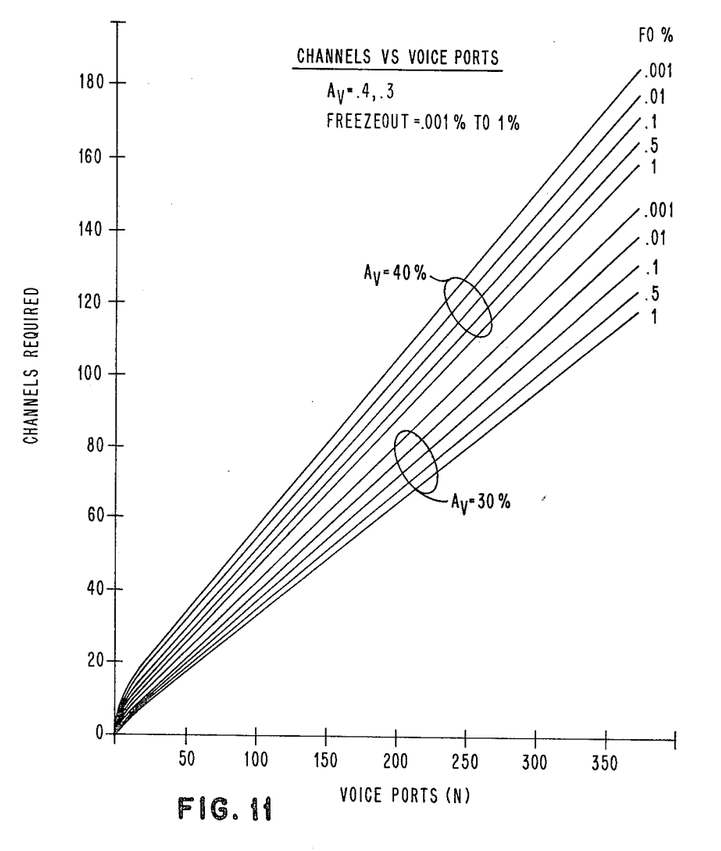
FIG. 11 is a graph of the number of channels required as a function of voice ports for various voice activity probabilities in the subsidiary station.
Figure 12:
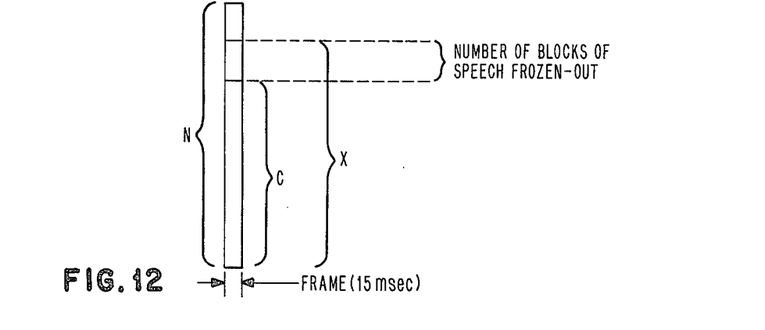
FIG. 12 is a schematic diagram illustrating the number of blocks of speech frozen-out in a typical frame.

To achieve a maximum VAC advantage in the SCC, the voice activity probability calculator 30 of FIG. 6 is used which measures ($A_V$) dynamically. It will determine the ratio of channels generated per frame for transmission, to the number of voice ports connected per frame. This ratio ($A_V$) is used to select the proper curve, from a family of curves, as shown in FIG. 11, which relate voice ports off-hook to channels required. To illustrate, FIG. 11 shows voice ports connected (N) versus channels required for A=0.4 and A=0.3, given a freeze-out (FO) fraction of 0.001% to 1%. The equation used to generate the curves is given as follows:

Calculation of Freeze-Out Percentage

X = # of blocks of speech generated during a frame
N = # of busy ports (speech generators)
C = # of channels available
$A_V$ = Activity factor (average)

$$FO\% = \frac{\text{number of blocks of speech frozen-out}}{\text{number of blocks of speech generated}} \times 100$$

Then:

$$FO\% = \frac{\sum_{X=C+1}^{N} (X - C) \binom{N}{X} A_V^X (1 - A_V)^{N-X}}{N \times A_V} \times 100\%$$

(Assuming Random, Independent Speech Generators)

Figure 13:
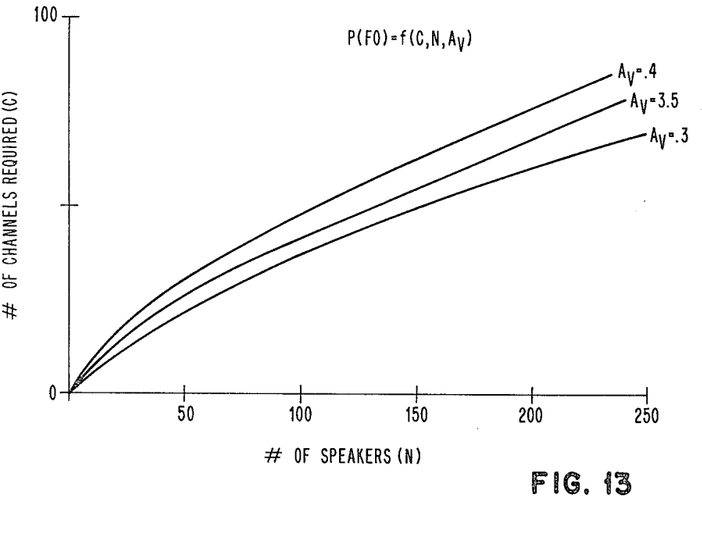
FIG. 13 is a graph of the number of channels required versus the number of speakers for various values of probability of freeze-out.

Alternatively, curves expressing probability of freeze-out can be used, as shown in FIG. 13. Again, a family of curves for various ($A_V$) can be drawn for particular probabilities of freeze-out. The same mechanism as discussed above, can be used to implement the family of VAC gain curves in the SCC.

Effective use of the VAC gain curve family of FIG. 11 requires calculation of activity ($A_V$). To calculate ($A_V$), a ratio is formed. The numerator is the sum of number of blocks of speech generated per frame during time-T. The denominator is the sum of the number of speakers connected per frame during time-T:

$$A_V = \frac{\Sigma_T(\text{BLOCKS OF SPEECH GENERATED/FRAME})}{\Sigma_T(\text{NUMBER OF SPEAKERS CONNECTED/FRAME})}$$

The accuracy of the ($A_V$) estimate is a function of the number of samples considered, that is, the greater the number of samples, the more accurate is the estimate of ($A_V$). To maintain consistant accuracy with any size SCC, ($A_V$) can be computed once the value of the denominator is greater than a setable threshold. The time required to estimate ($A_V$) to a given accuracy is:

$$T \geq \frac{4 A_V (1 - A_V)^2 \times L}{N \sigma_A^2}$$

where L is the average talkspurt length, $\overline{\sigma_A^2}$ is the variance of ($A_V$) and N is the number of speakers. The summation of the number of speakers per frame during T is (T)×(N)×(1/0.015). There are 1/0.015 frames per second.

Thus, $$\Sigma_T(\text{NUMBER OF SPEAKERS/FRAME}) = \frac{4 A_V (1 - A_V)^2 \times L}{.015 \, \sigma_A^2}$$

Assuming $A_V$=0.3, $\overline{\sigma_A}$=0.01 and L=1 second, $$\Sigma_T(\text{NUMBER OF SPEAKERS/FRAME}) \doteq 10^5$$

It is reasonable to use a 20-bit number to represent this setable threshold ($2^{20} > 10^6$).

Network Channel Distribution Method

Figure 14:
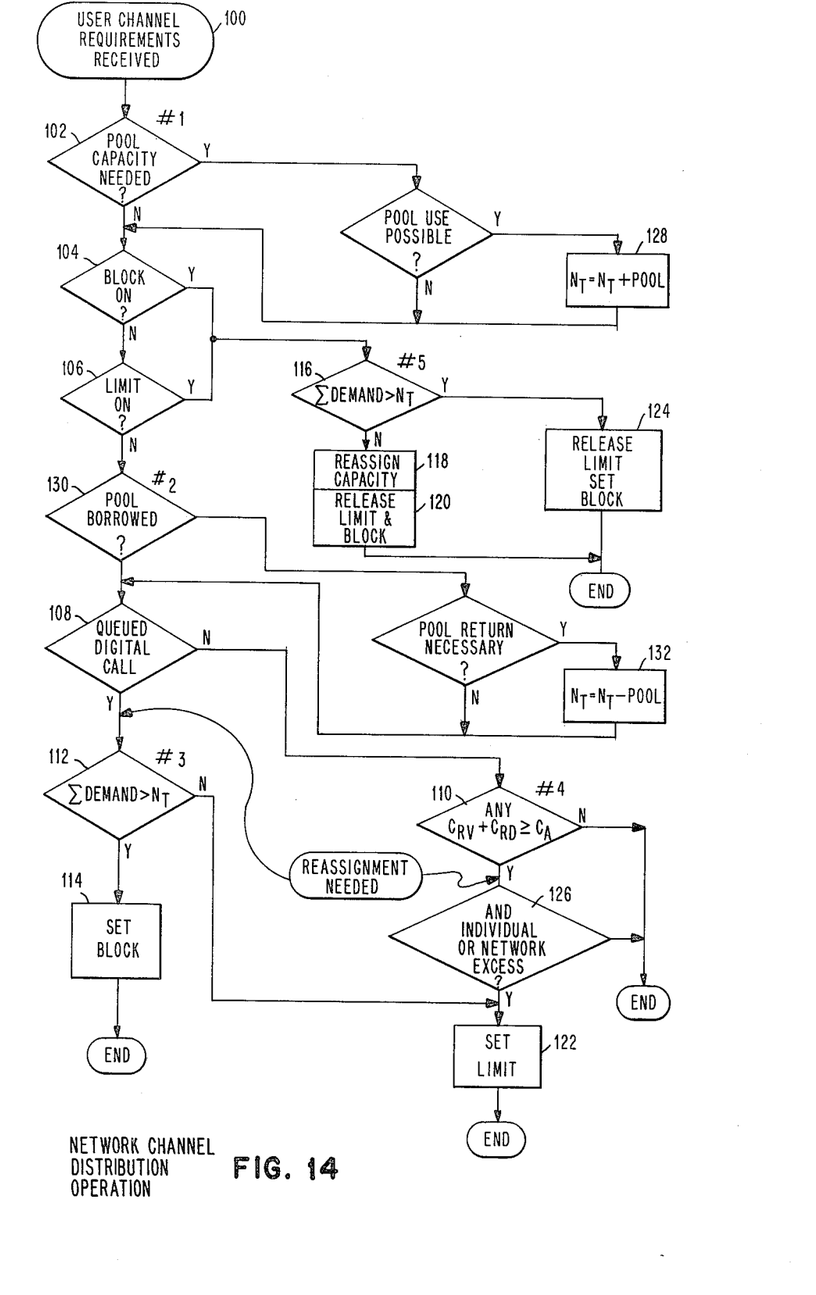
FIG. 14 is a flow diagram of the network channel distribution operation.

The function of this method is to properly manage network channel capacity. Generally, the network capacity is allocated to meet the needs of stations in the network. The reference station 3 receives the channel requirements for all SCCs 1 and 2 in the network. Channel requirements for voice ($C_{RV}$), channel requirements for the data ($C_{RD}$) and channel requirements and relative arrival time for the oldest queued data call ($C_{QD}$) appear in the Transmit Reference Burst (XRB) from each user station 1 and 2. ($C_{RV}$) specifies the actual requirement for voice calls in progress. ($C_{RD}$) specifies channels required to support connected data calls. If the network capacity is sufficient for the sum of all demands, all requirements are satisfied, and excess is distributed as a function of ($C_{RV}$). FIG. 14 illustrates the steps in the process. With respect to FIG. 14, the following relationships are established.

$$\Sigma \text{ Demand} = \Sigma_N C_{RV} + \Sigma_N C_{RD} + \Sigma_N C_{QD} \quad (1)$$

$$\text{Pool Capacity Needed} = N_T - \Sigma \text{ Demand} < P_T, \quad (2)$$

where $P_T$ is a threshold (number of channels) used for triggering access to pool Pool use Possible = (Pool use authorized). (3)
(Pool increment available).
($\Sigma_N C_{RD} + \Sigma_N C_{QD} \geq$ total that would be borrowed from pool)

Pool Return Necessary = ($\Sigma_N C_{RD} + \Sigma_N C_{QD} <$ total capacity (4)
borrowed) + ($N_T - \Sigma$ Demand $> R_R$), where $P_R$ is a threshold (number of channels) used for triggering return of channels to pool $$\text{Individual Excess} = \frac{\text{Capacity excess at some } SCC}{\text{Capacity allocation at that } SCC} > K \quad (5)$$

where K is a constant between $\phi$ and 1.
N = Network
$N_T$ = Total Network Capacity
. = Logical "and"
+ = Logical "or"

Assume user channel requirements have been received (step 100), pool capacity is not needed (step 102), and "block" (step 104) and "limit" (step 106) are off (released). A reassignment is needed if any digital data call is queued (step 108), or if any user demand exceeds or equals that user's present assignment (step 110) and excess capacity is available (step 112). Assume reassignment is needed because of a queued digital call (step 108). Does the sum of the voice demands ($C_{RV}$) plus the sum of data demands ($C_{RD} + C_{QD}$) exceed (step 110) the network channel capacity ($N_T$)? This is determined by the decision at step 112. If yes, a "block" (step 114) is set, which instructs all network stations 1 and 2 to reject incoming voice calls. Incoming digital calls are queued by 14 at the SCC 1 and 2. As existing voice and digital calls terminate, capacity becomes available.

Channel requirement messages via XRB from local SCCs 1 and 2 to the reference SCC 3 indicate the reduction in channel usage. Since a "block" (step 114) is on, each time channel requirements are received (step 104) their sum is compared to ($N_T$) (step 116). When the sum is less than or equal to ($N_T$), new assignments are computed (step 118) and transmitted. Blocking is then released (step 120). This operation will occur, for example, when a digital data call is placed, and network capacity is not available to accommodate it.

Suppose now that "limit" (step 106) and "block" (step 104) are off, a reassignment is needed and step 112 has a "NO" output. Here, "limit" is sent (step 122), which instructs all SCCs 1 and 2 to limit their channel usage to the channels required in the last demand message transmitted plus one channel $(1+C_{RV}+C_{RD})$, but not to exceed their last channel assignment. Within this limit, voice and data calls may be connected. When the next set of channel requirements are received, by the reference station 3, the reference 3 knows it represents the maximum usage. If step 116 indicates the total demand is less than or equal to $(N_T)$, new assignments are computed (step 118) and made. This operation will occur, for example, when network capacity exceeds total demand, but a reassignment is required to satisfy a particular user's increased demand. If, however, the output at step 116 is "YES," the excess capacity was taken by a user station. Now, "block" is set (step 124). Note that "block" and "limit" are network commands, and when used apply to all SCCs 1, 2, and 3 in a network.

In case a reassignment need is indicated by step 110 some excess must be available (step 126), or no reassignment is made. This is done to prevent excessive reassignment due to fluctuating voice requirements under heavy load. The excess can be at a particular user SCC, or in the network (e.g. just borrowed from the pool). If no excess is available, no reassignment is made.

When a new channel assignment set $(C_{ai})$ is computed for $SCC_i$, the following rule is used:

$$C_{ai} = C_{RVi} + C_{RDi} + E \frac{C_{RVi}^{\frac{1}{2}}}{\sum_{i=1}^{n} C_{RVi}^{\frac{1}{2}}}$$

where E is excess network capacity.

$$E = N_T - \sum_{i=1}^{n} C_{RV} + \sum_{i=1}^{n} C_{RD}$$

In this way, excess channel capacity in a network is distributed to user stations. The nonlinear distribution tends to equalize blocking probabilities throughout the network, thus equalizing service quality, as shown in FIG. 8. The actual implementation of the indicated square root function can be in the form of a table look-up versus $(C_{RV})$.

Transponder Channel Pool

When a network is heavily loaded and is authorized, the reference 3 may borrow channels for the network from the transponder pool. Step 102 as shown in FIG. 14, checks network load. Pool use is needed if the capacity excess of the network ($N_T$ — total demand) is less than a pool access threshold ($P_T$).

Pool use is possible if: pool use is authorized, pool capacity is available, or the total capacity that would be borrowed is less than the total capacity needed for digital data.

When pool capacity is taken, the capacity is added in step 128 to ($N_T$).

If pool capacity has been borrowed, a check is made in step 130 to see if capacity return is necessary. Capacity is returned to the pool if: network excess is greater than a return access threshold ($P_R$), or digital data capacity is less than the capacity borrowed.

When pool capacity is returned, the capacity is subtracted in step 132 from ($N_T$).

Queuing Digital Calls

As mentioned previously, unlike voice calls, when a digital call cannot be connected at an SCC it is queued in FIFO 14. This section explains the queue system in more detail in connection with FIGS. 5 and 15.

A. Local SCC 1 or 2;

1. A FIFO queue 14 exists at each SCC 1, 2, and 3 that queues data calls (that do not exceed the SCC limit) when capacity is not available locally at step 154, or "block" is on at step 152 in FIG. 15.

Figure 15:
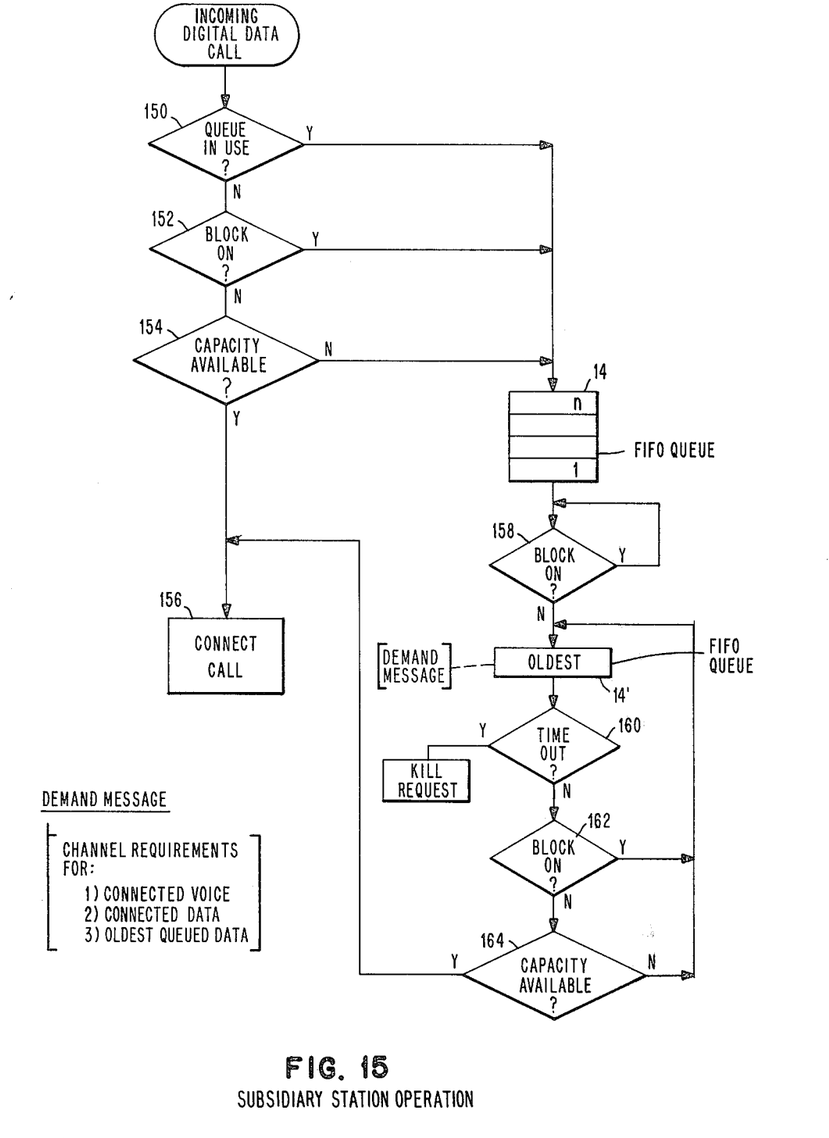
FIG. 15 is a flow diagram of the operation in a subsidiary station.

2. If capacity is available locally at step 154 and "block" is not on at step 152, data calls are connected at 156 whenever possible.

3. "Block" prevents connection of any call under the following conditions: voice calls are rejected, digital data calls are queued.

4. If the reference station 3 increases the capacity assignment of an SCC 1 or 2 by the amount needed to satisfy the oldest queued request 14', that call will be connected, and the next oldest queued call, if any, will be promoted to the oldest position 14'. The next demand message sent by the SCC 1 will reflect the call that was connected, and will show the "new" oldest queued capacity requirement, and the relative time of arrival of the request shown. The foregoing can be performed even if "block" is on, allowing the reference station 3 to "advance" individual queued data calls at particular SCCs 1 and 2 while maintaining the blocking of voice calls. This operation may be necessary to maintain a first come, first serve discipline across a network when serving queued digital data calls.

5. FIG. 15 illustrates overall operation when a data call request arrives at a local SCC 1 or 2. First a check 150 is made to see if any calls are waiting in the queue. If so, all subsequent data calls are queued. Also, if "block" is on at 152, calls are queued. If capacity is not locally available at 154, the call is queued. The queue is FIFO 14. The queue is checked at 160 for calls that have timed-out and they are removed. The capacity requirement of the call in the oldest position, if any, appears in the demand message ($C_{QD}$). If "block" is not on (step 152), and capacity is available (step 154), the queued calls are connected in FIFO order.

B. Reference SCC 3:

A reassignment is necessary any time an entry appears indicating a queued data call. When the network is heavily loaded, digital calls might queue-up at several SCCs. After "block" is invoked, the reference 3 attempts to satisfy the total demand for that group of oldest queued data calls. This is done when step 116 of FIG. 14 has a "NO" output, which results in "block" being released (step 120) and new assignments being issued (step 118), which give all local SCCs 1 and 2 enough channel capacity to connect the oldest queued data call.

If additional calls are queued (step 108) at some local SCCs 1 and 2, "block" will be invoked again (step 114), and the procedure repeated. This procedure tends to keep connection of digital data calls within a network in FIFO order. In effect, the reference 3 services groups of digital data calls.

The reference station 3 will service the group of oldest queued data calls in FIFO order as indicated by their respective times of arrival, as shown in the demand messages from the SCCS 1 and 2. To avoid completing the destination end of a call while the origination end is still queued, the reference station 3 will not satisfy the capacity requirement of any "destination connection" while an "origination connection" having an equal or earlier time of arrival remains queued at some other SCC 1 or 2.

C. Signaling Message Conditions for Digital Data Calls:

It can be assumed that several full duplex calls originate between many SCCs in a network. With conventional signaling protocol, requests might arrive at the reference SCC 3 in a sequence such that capacity can be allocated to one leg of each conversation, but not to the other. Thus, when capacity does, in fact, exist to complete some of these full duplex calls, none are completed because one leg cannot get the required capacity.

The solution to this problem is to provide signaling message protocol for high-speed digital calls where the called SCC is signaled at approximately the same time the call request occurs at the originator SCC. Thus, both requests for channel capacity will reach the reference station 3 at about the same time.

Since the reference station 3 services groups of requests, both channel requests for a particular data call will most likely be in the same group, and thus receive the required capacity at the same time.

While the invention has been particularly shown and described with reference to the preferred embodiment thereof, it will be understood by those skilled in the art that the foregoing and other changes in form and detail may be made therein without departing from the spirit and scope of the invention.

Having thus described our invention, what we claim as new, and desire to secure by Letters Patent is:

1. In a TDMA satellite communications system including a satellite transponder, a reference station and a plurality of ground stations, each ground station having input ports for connecting asynchronous service requests for voice transmission or data transmission from a terrestrial network to the satellite transponder, the reference station assigning a subplurality of ($N_I$) channels from a plurality of ($N_T$) time division channels to each ground station based upon the demand made by each respective ground station for channel capacity, the method comprising the steps of:

computing in each ground station the channel demand based upon said port requests;

transmitting by each ground station its channel demand to the reference station;

comparing in said reference station the channel demand for each ground station with its corresponding existing assigned number of channels;

summing the channel demands from all of said ground stations if any channel demand exceeds its corresponding existing channel assignment;

transmitting from said reference station a limit command if the sum of all the channel demands is less than the total capacity ($N_T$), to limit the number of channels used in each ground station to the last assigned number of channels;

allocating in said reference station a new channel assignment for each ground station approximately equal to said channel demand plus a portion of excess channels equal to ($N_T$) minus the sum of the channel demand, in proportion to the relative demand of each ground station to the total demand;

transmitting from said reference station the new channel assignments;

sending a block command from said reference station if said sum of the channel demands is greater than the total channel capacity ($N_T$), to block voice requests at each ground station;

blocking voice requests at each ground station in response to said blocking command and periodically transmitting channel demands to said reference station which decrease as the use of said ports diminishes;

summing said channel demand in said reference station;

assigning new channels ($N_I$) to that ground station requiring additional channels when the sum of the channel demands is less than the total channel capacity ($N_T$);

transmitting from said reference station a revocation message to revoke said blocking message.

2. In a TDMA satellite communication system including a satellite transponder, a reference station and a plurality of ground stations, each ground station having input ports for connecting asynchronous service requests for voice transmission or data transmission from a terrestrial network to the satellite transponder, the reference station assigning a subplurality of channels ($N_I$) from a plurality ($N_T$) of time division channels to each ground station based upon the demand made by each respective ground station for channel capacity, where in the improvement comprises:

means in each of said ground stations connected to said ports, for calculating channel demands based upon port requests;

means connected to said calculating means for transmitting said channel demand to said reference station;

means in said reference station for receiving said transmitted channel demands for each of said ground stations;

means connected to said receiving means for comparing the channel demand from each ground station with its corresponding channel assignment;

means connected to said comparison means for summing all of said channel demands if any channel demand is greater than its corresponding existing channel assignment;

means connected to said comparison means for sending a limit command to said ground stations if the sum of said channel demand is less than said total channel capacity ($N_T$);

means in each of said ground stations for receiving said limit command;

means connected to said receiving means in said ground station for limiting the channels used to the last channel demand, in response to the reception of said limit command;

means in said reference station connected to said comparison means for allocating new channels for each of said ground stations equal to the corresponding channel demand plus a portion of excess channels equal to ($N_T$) minus the sum of the channel demands, in proportion to the relative demand of the respective ground station with respect to the total channel demand;

means in said reference station for transmitting the new channel assignments to said ground station;

means in said reference station connected to said comparison means, for sending a blocking command to said ground station if the sum of the channel demands are greater than ($N_T$);

means in each ground station for receiving said blocking command;

means in each ground station connected to said blocking reception means for blocking additional voice requests in response to said blocking command;

means in each ground station for periodically transmitting channel demands which decrease as the usage of said ports diminish;

means in said reference station for summing said channel demands;

means in said reference station for allocating new channels ($N_I$) for the station in need of additional channel capacity, when the sum of the channel demand is less than ($N_T$);

means in said reference station for transmitting the new assignments and a revocation message revoking said blocking command.

3. The apparatus of claim 2, wherein said means for calculating channel demand further comprises:

means for allocating the proper number of communication channels necessary to provide the required level of service based upon the number of active ports and their individual voice activity factors.

4. The apparatus of claim 3 which further comprises:

means for calculating an activity parameter A as the average ratio of the number of channels required per frame to the total number of voice ports being served per frame.

5. The apparatus of claim 2 which further comprises:

means in each of said ground stations for storing on a first-in-first-out basis, new requests for data transmission during the period when said blocking command is in effect;

whereby, under heavy network load, the calling party will not hang up when spare channel capacity can be made available within a short period of time after the data call was initiated.

6. In a TDMA satellite communication system including a satellite transponder, a reference station and a plurality of ground stations, each ground station having input ports for connecting asynchronous service requests for voice transmission or data transmission from a terrestrial network to the satellite transponder, the reference station assigning a subplurality of channels ($N_I$) from a plurality ($N_T$) of time division channels to each ground station based upon the demand made by each respective ground station for channel capacity, wherein the improvement comprises:

channel demand logic in each of said ground stations connected to said ports, for calculating channel demands based upon port requests;

a ground station transmitter connected to said channel demand logic for transmitting said channel demand to said reference station;

a reference station receiver in said reference station for receiving said transmitted channel demands for each of said ground stations;

a channel demand array in said reference station having an input connected to said receiver, for storing the present channel demands of all of said ground stations;

a present channel assignment array in said reference station having an input connected to said receiver, for storing the present channel assignments of all of said ground stations;

a first comparator in said reference station having inputs connected to said channel demand array and to said present channel assignment array for outputting an enabling signal when the channel demand from any ground station is greater than its corresponding channel assignment;

an accumulator having an input connected to said first comparator for summing all of said channel demands;

a second comparator having inputs connected to said accumulator and to a register storing said value $N_T$, for outputting a first output enabling signal when the sum of said channel demands is less than said value $N_T$ and outputting a second output enabling signal when said sum of channel demands is greater than said value $N_T$;

a first AND gate having said output from said first comparator as a first input and said first output signal of said second comparator as a second input, for providing the logical AND function of its inputs as an output signal;

send limit logic connected to the output of said first AND gate for sending a limit command to said ground stations in response to said first enabling signal;

a reference station transmitter connected to said send limit logic, for transmitting said limit command to said ground stations;

a ground station receiver at each of said ground stations, for receiving said limit command;

a current assignment register connected to said receiver in said ground station for limiting the channels used to the last channel demand, in response to the reception of said limit command;

channel allocation logic in said reference station connected to said first output signal of said second comparator, for allocating new channels for each of said ground stations equal to the corresponding channel demand plus a portion of excess channels in a proportion to the relative demand of each respective ground station with respect to the total channel demand;

said transmitter in said reference station transmitting said new channel assignments to said ground stations.

7. The apparatus of claim 6, which further comprises:

a second AND gate in said reference station having said output from said first comparator as a first input and said second output signal of said second comparator as a second input, for providing the logical AND function of its inputs as an output signal;

send block logic in said reference station connected to said second AND gate, for sending via said reference station transmitter, a blocking command to said ground stations in response to said second enable signal;

said ground station receiver at each ground station receiving said blocking command;

port request block logic in each ground station connected to said ground station receiver, for blocking additional voice requests in response to said blocking command;

said channel demand logic in each ground station periodically transmitting channel demands which decrease as the usage of said ports diminish;

said accumulator in said reference station summing said channel demands;

said channel allocation logic in said reference station allocating new channels ($N_I$) for the station in need of additional channel capacity, when the sum of the channel demand becomes less than ($N_T$);

a revoke limit/block logic in said reference station having an input connected to said channel allocation logic, for outputting a revocation message;

said transmitter in said reference station transmitting the new assignments and said revocation message revoking said blocking command to said ground stations.

8. The apparatus of claim 7, which further comprises:

a FIFO memory in each of said ground stations for storing on a first-in-first-out basis, new requests for data transmission during the period when said blocking command is in effect;

whereby, under heavy network load, the calling party will not hang up when spare channel capacity can be made available within a short period of time after the data call was initiated.

* * * * *